Oct. 9, 1951  A. E. MURRAY  2,570,970

SPRING SUPPORT FOR BICYCLE SEATS

Filed March 5, 1947

INVENTOR
*Alan E. Murray*
BY
*Arthur Wright*
ATTORNEY

Patented Oct. 9, 1951

2,570,970

UNITED STATES PATENT OFFICE 2,570,970

SPRING SUPPORT FOR BICYCLE SEATS

Alan E. Murray, New York, N. Y.

Application March 5, 1947, Serial No. 732,594

4 Claims. (Cl. 155—5.17)

My invention relates particularly to seats adapted to support the body in any desired position and for any desired purpose, for example as applied to vehicles, such as bicycles, automotive vehicles, motorcycles, etc.

The object of my invention is to provide a seat of the above character, whereby the physiological action of the hips in action is made possible and whereby the detrimental effects due to vibrations and other undesirable motions ordinarily transmitted to the body are substantially eliminated. Another object is to provide a construction of this character which is especially applicable for use on bicycles which are driven manually or by means of an internal combustion engine, or otherwise. Another object is to provide a seat which, thus, substantially eradicates the deleterious effects of motor vibrations as well as those due to unevennesses in the road over which the vehicle may be traveling. Again, a further object is to accomplish this purpose by the elastic suspension of the seat from the support above which it is carried, as for instance from the frame of a bicycle. A still further object is to accomplish this end, with the aid of elastic suspension by means of rubber or a rubber substitute, for instance neoprene, which is under a restrained or restricted amount of tension. A further object is to avoid the transmission of vibrations from any contacting or chattering metal contacts. Further objects of my invention will appear from the detailed description of the same hereinafter.

While my invention is capable of many different forms, for the purpose of illustration I have shown only one form thereof in the accompanying drawings, in which—

Figure 1:
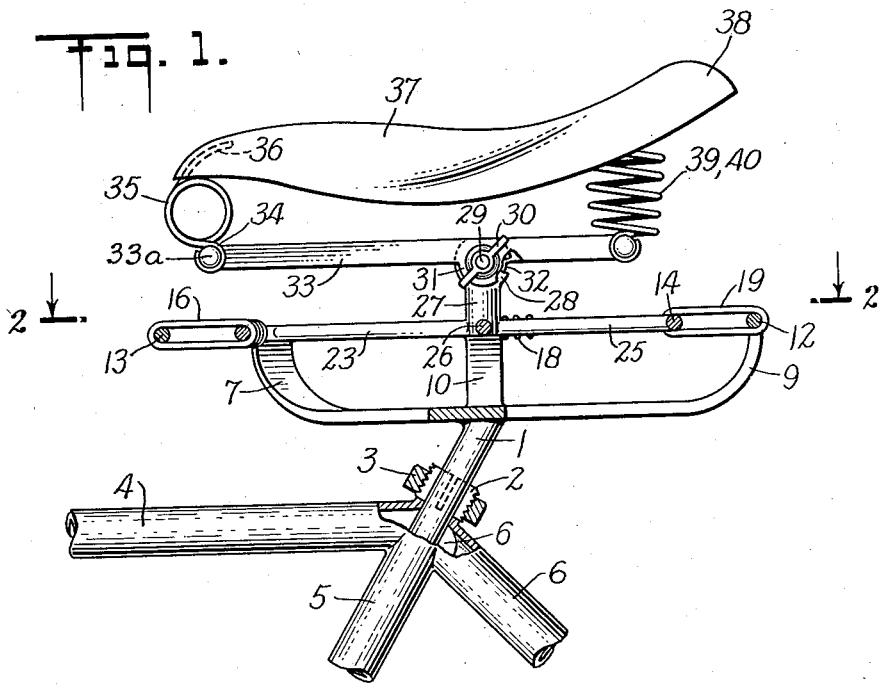
Figure 2:
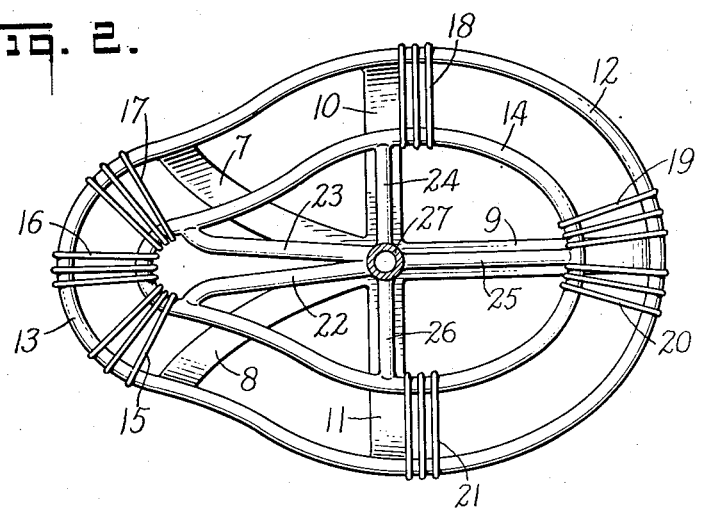

Fig. 1 is a side elevation of a bicycle seat made in accordance with my invention; and Fig. 2 is a horizontal section thereof, taken on line 2—2 of Fig. 1.

Referring to the drawings, I have shown a tubular bicycle seat post or supporting rod 1 of the usual character, which may be received in a split extension 2, having screw-threaded on the outside thereof a nut 3 to tighten and hold the tubular post 1 in any desired position of vertical or rotatable adjustment. The extension 2 may, in the usual way, form a part of a bicycle frame having a forwardly extending tubular frame member 4, a downwardly and forwardly inclined tubular frame member 5 and smaller rearwardly and angularly inclined tubular frame members 6.

In order to provide a support, for the saddle hereinafter referred to, the upper end of the tubular post 1 has welded thereto two forwardly and upwardly bent arms 7 and 8, also a similar rearwardly and upwardly bent arm 9 and two laterally directed upwardly bent arms 10 and 11. The upwardly directed portions of all of these arms 7, 8, 9, 10 and 11 are welded to an outer pear-shaped horizontal support frame 12, the narrow end 13 of which is directed forwardly. Within the outer frame 12 there is a similarly shaped inner and smaller frame 14. The inner frame 14, which is symmetrically arranged within the outer frame 12, is supported from the latter by a succession of or groups of windings of one or more rubber or rubber substitute cords 15, 16, 17, 18, 19, 20 and 21. This rubber cord may be in the form of a succession of endless rubber rings, or it may be in the form of one or more rubber or rubber substitute cords of any desired thickness, as for instance $\frac{1}{16}$" in diameter, the ends of which may be tied or secured together in any desired manner. In each instance the rubber or rubber substitute cords are preferably applied under some tension or stretching but not to such an extent as to stretch the same to the elastic limit thereof when applied. As shown in the drawings, these groups of cords 15, 16, 17, 18, 19, 20 and 21 may be in isolated groups or they may be evenly distributed between the frames 12 and 14, and, in fact, some or all of the windings may be placed on top of one another if desired. Extending inwardly and horizontally from the inner frame 14 there are, furthermore, provided five spider arms 22, 23, 24, 25 and 26, the inner ends of which are all welded to a tubular metal standard 27, having an upper flattened end 28 through which there is passed a screw-threaded bolt 29 having thereon a winged nut 30 to tighten thereon and hold in place a pair of spaced ears 31 and 32 which embrace the opposite sides of the flattened extension 28 on the end of the tubular standard 27. The two ears 31 and 32 are carried by or fastened, by welding or otherwise, to a horizontal saddle plate or bar 33, the inclination of which to the horizontal may be changed, if desired, by the adjustment of the winged nut 30. This saddle plate or bar 33 has a transverse pin 33a fastened thereto, by welding or otherwise, at the front thereof and a similar transverse pin at the rear thereof, a lower arm 34 on each of two helical springs 35 being located, respectively, around an end of the pin 33a, each said spring having an upper arm 36 thereon fastened beneath a leather saddle or seating device 37 which extends at its front end over the said arm 36 of each helical spring 35. The saddle 37, furthermore, has an upwardly and laterally flared rear end 38 which is supported by two helical springs 39 and 40, arranged side by side beneath and fastened to the underside of the flared end 38 of the saddle 37. These springs 39 and 40 are supported upon and fastened to the saddle plate 33 in any desired manner, as for example by the lower ends of the springs 39 and 40 being located, respectively, around the ends of said transverse pin fastened to the rear of the bar 33.

In the operation of my invention, it will be understood that the saddle post 1 may be received in the frame of the bicycle at any desired angle to the vertical, according to the construction of the particular bicycle having the frame members 4, 5 and 6 thereon. Also, the position of elevation of the post 1 may be changed by loosening and then tightening the nut 3. The angle of the saddle 37 to the horizontal may, furthermore, be adjusted, as desired, by means of the winged nut 30. When the rider is supported on the saddle 37, an extraordinary degree of comfort is experienced, whether the occupant is in a position of action, as in driving a bicycle, or at rest on the saddle 37 or whether the vehicle on which it may be mounted is traveling over the usual roads, as there is a practical elimination or eradication of any vibrations that would otherwise be transmitted to the occupant of the saddle due either to the operation of the reciprocating parts of the internal combustion motor driving the vehicle or the unevennesses of the road bed over which the vehicle is traveling, or due to the starting and stopping of the vehicle. These vibrations are effectually eliminated because of the elastic suspension of the stretched rubber elements or groups of rubber cords 15, 16, 17, 18, 19, 20 and 21, as the latter entirely absorb any such vibrations. This construction, furthermore, eliminates entirely the possibility of any chattering metal contacts which otherwise would transmit vibrations, especially when loosened or not in proper adjustment. This arrangement, furthermore, eliminates possible physical damage or injury to the rider where such vibrations are extensive or continuous in character, as in previous seats, especially in the case of motorcycles, in the operation of which the vibrations from the motor and road bed are so extremely great as to render their use generally undesirable. Furthermore, by eliminating vibrations of this character, both from the operation of the motor and from unevennesses of the road, a large amount of the fatigue that would otherwise be produced is eliminated so that greater distances may be traveled with impunity than would otherwise be the case.

While I have described my invention above in detail I wish it to be understood that many changes may be made therein without departing from the spirit of the same.

I claim:
1. A bicycle seat having beneath the same an adjustable horizontal support frame including a supporting rod for said support frame, an elastic stretched rubber-like suspension in the form of rubber strands stretched from a second horizontal frame within said first frame beneath the seat to the support frame, and a seat supported on said second frame.

2. A seat having beneath the same a horizontal support frame including a supporting rod for said support frame, an approximately horizontal frame within the first frame, an elastic suspension means in the form of stretched rubber-like strands, extending beneath the seat to the frame support from the approximately horizontal frame, and a seat, said second frame having a pivoted adjustable connection to said seat.

3. A seat having beneath the same a horizontal support frame including a supporting rod for said support frame, an approximately horizontal frame within the support frame, an elastic suspension means, in the form of stretched rubber-like strands extending beneath the seat to the support frame from the approximately horizontal frame, and a seat, said second frame having a pivoted adjustable connection to the seat and provided with spider-like radial arms leading from the pivoted connection to said second frame.

4. A bicycle saddle having beneath the same a support including a supporting post for said saddle, an approximately horizontal frame and an elastic suspension means, in the form of stretched rubber-like strands, extending from beneath the saddle to the support from the approximately horizontal frame, said support having a frame surrounding the first frame and from which the first mentioned frame is supported by said strands, the second frame having spider-like radial arms leading from said frame to a saddle standard and a saddle supported on said second frame.

ALAN E. MURRAY.

REFERENCES CITED

The following references are of record in the file of this patent:

UNITED STATES PATENTS

| Number | Name | Date |
|---|---|---|
| 544,625 | Montague | Aug. 13, 1895 |
| 2,273,286 | Robert | Feb. 17, 1942 |

FOREIGN PATENTS

| Number | Country | Date |
|---|---|---|
| 58,577 | Denmark | Apr. 7, 1941 |
| 820,295 | France | July 26, 1937 |
| 478,736 | Great Britain | Jan. 24, 1938 |